Figure 1:
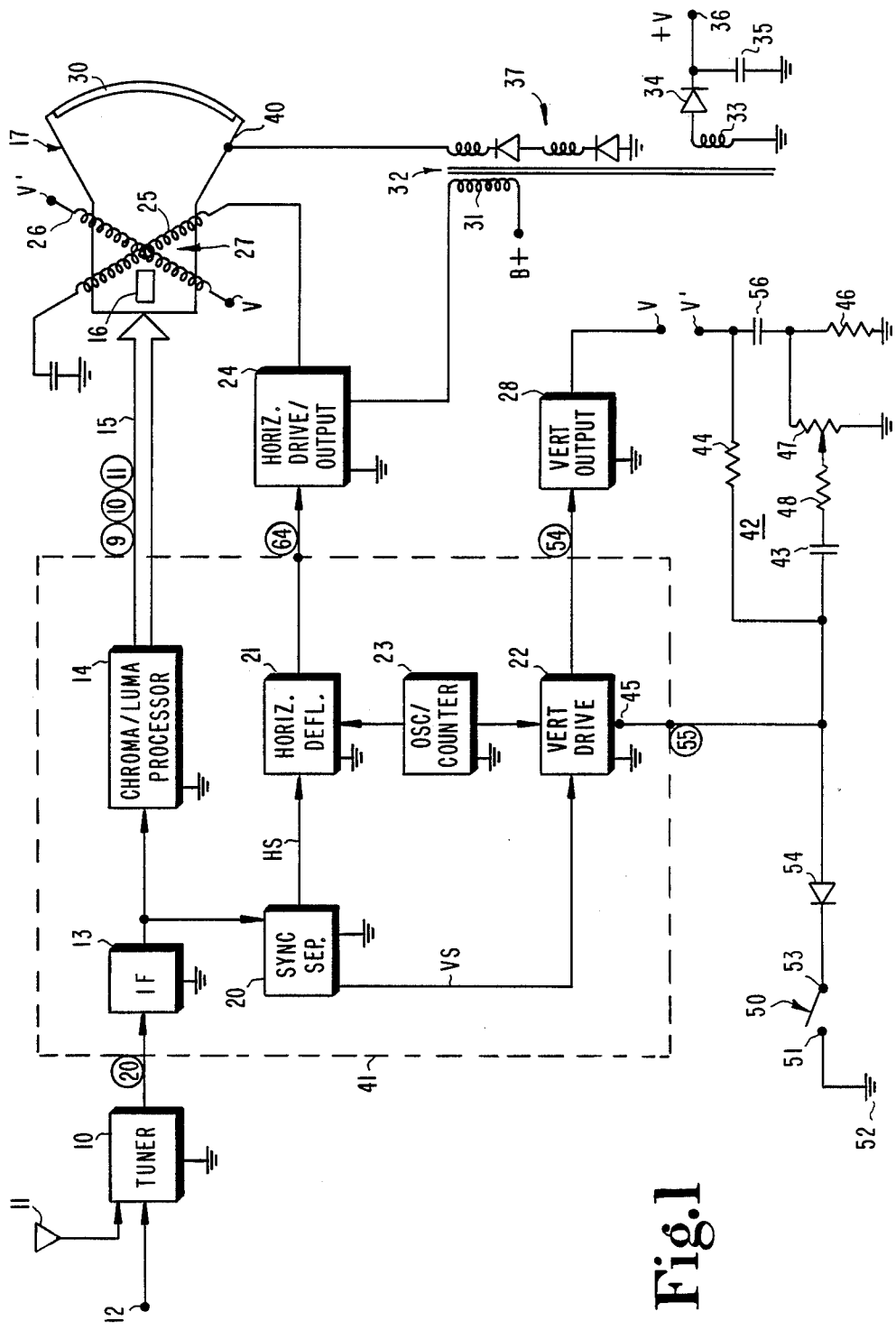

United States Patent [19]

Pan et al.

[11] Patent Number: 4,731,564
[45] Date of Patent: Mar. 15, 1988

[54] SERVICE SWITCH FOR VIDEO DISPLAY APPARATUS

[75] Inventors: Harry Pan; Ching L. Yu, both of Taipei, Taiwan

[73] Assignee: RCA Corporation, Princeton, N.J.

[21] Appl. No.: 862,287

[22] Filed: May 12, 1986

[51] Int. Cl.$^4$ .......................... H01J 29/70; H01J 29/76
[52] U.S. Cl. ........................................ 315/397; 358/10
[58] Field of Search ................... 315/396, 397; 358/10

[56] References Cited

U.S. PATENT DOCUMENTS

| | | | |
|---|---|---|---|
| 3,114,796 | 12/1963 | Stark, Jr. et al. | 178/5.4 |
| 4,272,777 | 6/1981 | Fitzgerald | 358/10 |
| 4,484,111 | 11/1984 | McMorrow, Jr. et al. | 315/397 |

OTHER PUBLICATIONS

CTC 85 Color Chassis Tech Manual Circuit Diagram, 1977.
CTC 136 Color TV Basic Service Data Circuit Diagram, 1986.

Primary Examiner—Theodore M. Blum
Attorney, Agent, or Firm—Paul J. Rasmussen; Joseph J. Laks; Scott J. Stevens

[57] ABSTRACT

A vertical deflection circuit for a video display apparatus includes a service switch that collapses vertical or field rate scan in order to facilitate adjustment of cathodes ray tube electron beam drive levels. The service switch operates by referencing the vertical sawtooth signal generator, the AC feedback, and the DC feedback to ground potential so that no input is applied to the vertical drive circuitry.

6 Claims, 2 Drawing Figures

SERVICE SWITCH FOR VIDEO DISPLAY APPARATUS

This invention relates to video display apparatus and, in particular, to service switch circuitry that disables vertical deflection.

During manufacture and assembly of a video display apparatus, such as a television receiver, it may be necessary or desirable to adjust the video drive circuitry to appropriate levels so that the red, green and blue designated electron beams of a cathode ray tube are generated in a manner that will produce proper color images on the phosphor display screen of the tube.

The previously described adjustments are typically performed while the vertical deflection circuitry is disabled. The resulting single horizontal line is more easily observed than a complete raster field when setting electron beam drive and cutoff levels. The circuitry utilized to perform the disabling function is typically referred to as a service switch. It is desirable to provide as simple and economical service switch circuit as possible, even as the deflection and signal processing circuitry of the video display apparatus is becoming more highly integrated and complex.

In accordance with the present invention, a field rate deflection circuit for a video display apparatus comprises a circuit for providing a field rate deflection current. A circuit samples the deflection current and produces representative output signal. The output signal is applied to the deflection current producing circuit to control its operation. A service switch disables the means for applying the output signal to the deflection current producing circuit in order to disable the deflection current producing circuit.

Figure 2:
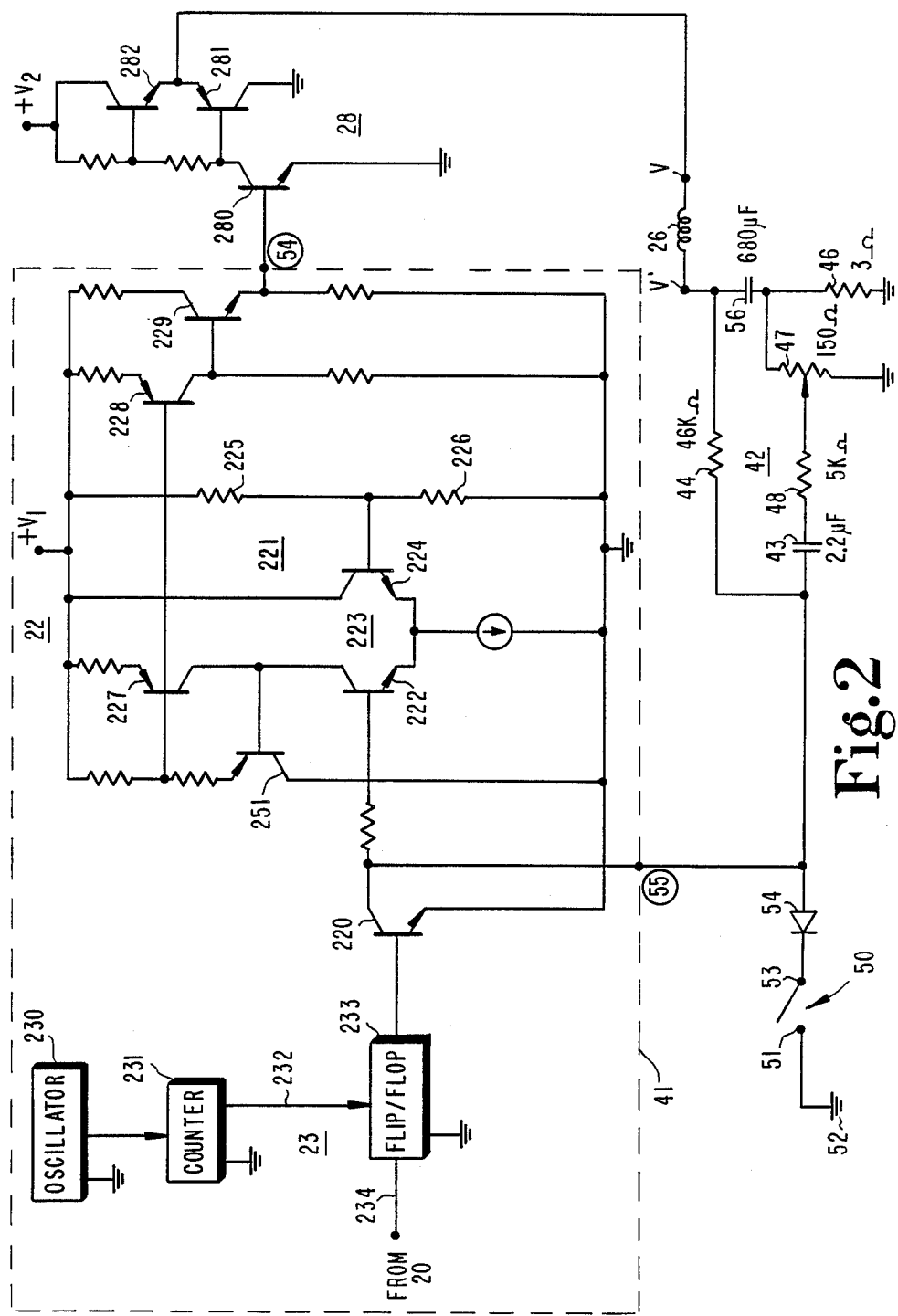

In the accompanying drawing,

FIG. 1 is a block and schematic diagram of a portion of a video display apparatus incorporating a deflection circuit in accordance with an aspect of the present invention; and FIG. 2 is a schematic diagram of a portion of the deflection circuit of FIG. 1, illustrating more detail.

Referring to FIG. 1, a video display apparatus such as a television receiver, incorporates tuning circuitry 10 that illustratively receives an input signal from an antenna 11 or a cable system (not shown) via a terminal 12. The input signal is illustratively a radio frequency (rf) modulated signal that includes video and audio information. For simplicity, only the video processing structure will be described. Tuning circuitry 10 demodulates the input signal and applies its output to intermediate frequency circuitry 13 which produces a composite video signal that also includes line and field rate synchronizing information. The video signal is applied to chrominance and luminance processing circuitry 14 which produces red, green and blue color drive signals along conductors designated 15 that are applied to an electron gun assembly 16 located within the neck of a cathode ray tube (CRT) 17.

The composite video signal is processed by synchronizing (sync) pulse separator circuit 20 to produce horizontal sync pulses that are applied to horizontal or line rate deflection circuitry 21, and vertical sync pulses that are applied to vertical or field rate deflection circuitry 22. The circuit of FIG. 1 illustratively incorporates oscillator and counter circuitry 23 that produces accurately timed horizontal and vertical rate pulses to control synchronization of the horizontal and vertical deflection circuits under normal operation.

Horizontal deflection circuitry 21 produces horizontal deflection rate switching pulses that are applied to horizontal driver and output circuitry 24. In response, horizontal rate deflection current is produced in horizontal deflection coils 25 located on CRT 17. Vertical drive circuit 22 and vertical output circuit 28 produce vertical rate deflection current in vertical deflection coils 26, also located on CRT 17, via terminals V and V'. Horizontal and vertical deflection coils 25 and 26 comprise deflection yoke 27 which produces the desired time varying electromagnetic fields that cause deflection or scanning of the electron beams produced by electron gun assembly 16. The beams are caused to be deflected in a predetermined pattern in order to form a raster on the phosphor display screen 30 located on the face of CRT 17.

Horizontal driver and output circuit 24, illustratively of the flyback type, produces horizontal rate retrace pulses that are applied to primary winding 31 of a power transformer 32. The retrace pulse voltage across primary winding 31 generates, by transformer action, voltages across the secondary windings of transformer 32. The voltage produced across winding 33, for example, is rectified by diode 34 and filtered by capacitor 35 to form a supply voltage +V at a terminal 36 which may be used to power various load circuits of the video display apparatus. The voltage produced across winding 37 generates the high voltage level that is applied to the high voltage or ultor terminal 40 of CRT 17.

FIG. 1 also shows, by dashed line 41, that several of the previously described circuits, including chrominance and luminance processing circuit 14 and vertical drive circuit 22, may be incorporated as part of a single integrated circuit. Such an integrated circuit is sold by Toshiba Corporation and is identified as T7777, having terminal pin designation as shown.

The operation of vertical drive circuit 22 is controlled by feedback circuit 42. The vertical deflection rate sawtooth drive signal is formed by charging of a capacitor 43 by the deflection current via a resistor 44, in accordance with the s-shaping parabolic voltage developed at the upper terminal of s-shaping capacitor 56. Capacitor 43 is charged during the vertical scan interval. This voltage is applied to vertical drive circuit 22 at a terminal 45. During the vertical reset or retrace interval, capacitor 43 is discharged through vertical drive circuit 22. The voltage developed across capacitor 43 therefore forms the vertical rate sawtooth signal applied to vertical drive circuit via terminal 45. AC feedback of the deflection current to vertical drive circuit 22 is via resistors 46, 47 and 48 and capacitor 43. DC feedback is provided by resistor 44.

In accordance with an aspect of the present invention, a service switch arrangement comprises a switch 50 having a terminal 51 connected to a point of reference potential, illustratively shown as ground 52. The other terminal 53 is connected to the cathode of a diode 54. The anode of diode 54 is connected to terminal 45.

When switch 50 is in its "normal" or open position, diode 54 does not conduct and the vertical deflection circuit operates normally. When switch 50 is in its "service" or closed position, however, terminal 45 of vertical drive circuit 22 becomes grounded through diode 54. This effectively grounds the AC and DC current feedback to vertical drive circuit 22, and discharges capacitor 43 via diode 54 and switch 50 to ground, thereby preventing the formation of the vertical sawtooth signal. Without the presence of the vertical sawtooth drive signal and the AC and DC feedback signals, there is no input signal to vertical drive circuit 22 and vertical drive circuit 22 becomes effectively disabled. This in turn disables vertical output circuit 28 so that no vertical deflection current is produced. The lack of vertical deflection of the electron beams permits the set-up or service adjustment of the electron beam drive circuitry in a simple and efficient manner.

FIG. 2 illustrates a portion of the video display apparatus of FIG. 1, including vertical drive circuit 22, in greater detail. Element in FIG. 2 corresponding to those in FIG. 1 are designated with the same reference numeral.

Oscillator 230 illustratively produces a high frequency signal that is divided by counter 231 to provide vertical or field-rate pulses on a conductor 232 having a predetermined timing relationship with the horizontal or line-rate frequency. The pulses on conductor 232 are applied to a flip-flop circuit 233. The separated vertical sync pulses from sync separator 20 are also applied to flip-flop circuit 233 via a conductor 234. Flip-flop circuit 233 generates vertical deflection rate pulses in coincidence with the pulses from sync separator 20 or, in the absence of those pulses, due to a weak or absent video signal, for example, in response to the pulses from counter 231. The output of flip-flop circuit 233 is applied to the base of a ramp reset transistor 220, causing transistor 220 to conduct. Conduction of transistor 220 discharges ramp capacitor 43 through transistor 220 to ground. When transistor 220 is nonconductive, capacitor 43 charges via resistor 44 as previously described. The vertical deflection rate sawtooth drive signal is therefore formed at the collector of transistor 220. This sawtooth drive signal is applied to error amplifier 221 of vertical drive circuit 22 which amplifies the sawtooth signal. As capacitor 43 charges, the base voltage on transistor 222 increases, causing transistor 222 to become more conductive. Transistor 222 forms part of a differential amplifier 223 along with a transistor 224. As transistor 222 becomes more conductive, its collector voltage decreases, thereby decreasing the base voltage of a transistor 251, causing it to become more conductive. As transistor 251 becomes more conductive, transistors 227 and 228 also become more conductive. As transistor 228 becomes more conductive its collector voltage increases, thereby increasing the conduction of transistor 229. The emitter of transistor 229 becomes the output of error amplifier 221. The DC level of the sawtooth drive signal is therefor representative of an amplification factor or amount. The output of error amplifier 221 is applied to the base of a transistor 280 of vertical output circuit 28. As error amplifier output transistor 229 becomes more conductive in response to the increasing sawtooth ramp voltage, transistor 280 also becomes more conductive, which increases conduction in transistor 281 and decreases conduction in transistor 282. The junction of the emitter of transistors 281 and 282 form the output of vertical output circuit 28 which is coupled to vertical deflection winding 26. A positive slope sawtooth ramp signal will result in a vertical deflection waveform having a negative slope such that the signals produced by feedback circuit 42 are of the desired form. DC blocking capacitor 56 also provides some linearity or s-shaping of the deflection current. The DC current feedback via resistor 44 acts to establish the bias on the error base of transistor 222, and in effect controls the amplification of error amplifier 221.

Transistor 224 of differential amplifier 223 has its base bias fixed by resistors 225 and 226. Error amplifier 221 is therefore controlled via operation of differential amplifier 223 to maintain the desired amplifications of the sawtooth input signal in order to provide the proper level of deflection current. The AC feedback controls the amplitude of the generated sawtooth signal. Resistor 47 is adjustable to provide height control of the scanned raster on display screen 30 of cathode ray tube 17, shown in FIG. 1.

Closure of switch 50, therefore, prevents the establishing of any significant voltage at the input of error amplifier 221, thereby rendering transistor 222 nonconductive. This in turn causes transistors 251, 227, 228 and 229 to be nonconductive. With transistor 229 nonconductive, no output is provided to vertical output circuit 28 and therefore no deflection current is produced. The desired vertical collapse of the scanned raster occurs, thereby permitting the adjustment of the drive circuitry for electron gun assembly 16.

What is claimed is:

1. A field rate deflection circuit for a video display apparatus comprising:
    means for providing a field rate deflection current;
    means for sampling said deflection current and producing a feedback signal representative thereof;
    means for applying said feedback signal to said deflection current providing means to control the operation of said deflection current providing means; and
    a service connection means comprising means for preventing the application of said feedback signal to said deflection current providing means in order to disable said deflection current providing means.

2. The arrangement defined in claim 1, wherein said feedback signal producing means comprises a sawtooth signal generating means.

3. The arrangement defined in claim 1, wherein said feedback signal producing means comprises AC feedback generating means.

4. The arrangement defined in claim 1, wherein said feedback signal producing means comprises DC feedback producing means.

5. The arrangement defined in claim 1, wherein said means for preventing the application of said feedback signal comprises a switch for coupling said feedback signal producing means to a point of reference potential.

6. A deflection circuit for a video display apparatus comprising:
    means for generating a sawtooth drive signal having a DC voltage level representative of an amplification factor;
    a differential amplifier having a first terminal DC coupled to said sawtooth drive signal generating means;
    means for biasing a second terminal of said differential amplifier with respect to a reference voltage;
    a deflection amplifier DC coupled to said differential amplifier for being driven by said sawtooth drive signal for producing a deflection current having an amplitude representative of said DC voltage level;
    means coupled to said deflection amplifier for establishing said DC voltage level; and
    feedback means coupled to said DC voltage level establishing means for applying said DC voltage level to said first terminal of said differential amplifier for controlling the amplification of said drive signal.

* * * * *